May 1, 1962 R. H. BROWN 3,032,133
VEHICLE WHEEL ASSEMBLY
Filed April 13, 1960

INVENTOR
ROBERT HUTTON BROWN
BY
Harrington A. Lackey
ATTORNEY

3,032,133
VEHICLE WHEEL ASSEMBLY
Robert H. Brown, R.F.D. 4, Pulaski, Tenn.
Filed Apr. 13, 1960, Ser. No. 21,916
2 Claims. (Cl. 180—21)

This invention relates to a motor vehicle, and more particularly to an improved vehicle wheel assembly.

One object of this invention is to provide a vehicle wheel assembly in which a pair of wheels are disposed on opposite sides of the frame and longitudinally staggered with respect to each other.

Another object of this invention is to provide a vehicle wheel assembly including a pair of wheels on opposite sides of the vehicle frame, each wheel being mounted on a separate axle extending entirely transversely of the frame.

Another object of this invention is to provide a rear wheel assembly for a motor vehicle in which each rear wheel is mounted on a separate axle extending entirely transversely of the frame and each axle is independently driven on the opposite side of the frame from its corresponding wheel.

A further object of this invention is to provide a wheel assembly for a motor vehicle in which there is a minimum of unsprung weight and a maximum of shock absorption.

Another object of this invention is to provide a rear wheel assembly for a motor vehicle, in which each wheel is independenly suspended, rigidly controlled and has a minimum of deflection from the vertical when the wheels encounter irregular road surfaces.

A further object of this invention is to provide a rear wheel assembly for a motor vehicle, from which is eliminated all universal joints, transverse radius rods and conventional heavy unsprung rear axle housing design.

Another object of this invention is to provide a motor vehicle having a novel rear wheel and drive assembly incorporating a separate drive shaft for each rear wheel, extending along opposite sides of the frame, instead of the more massive unsprung drive shaft extending through the center of the frame, in order to reduce unsprung weight as well as the troublesome "tunnel-hump" in the center of the floor of the vehicle.

Further objects and advantages of this invention will be apparent from the following description taken in conjunction with the drawings, wherein.

Figure 1:
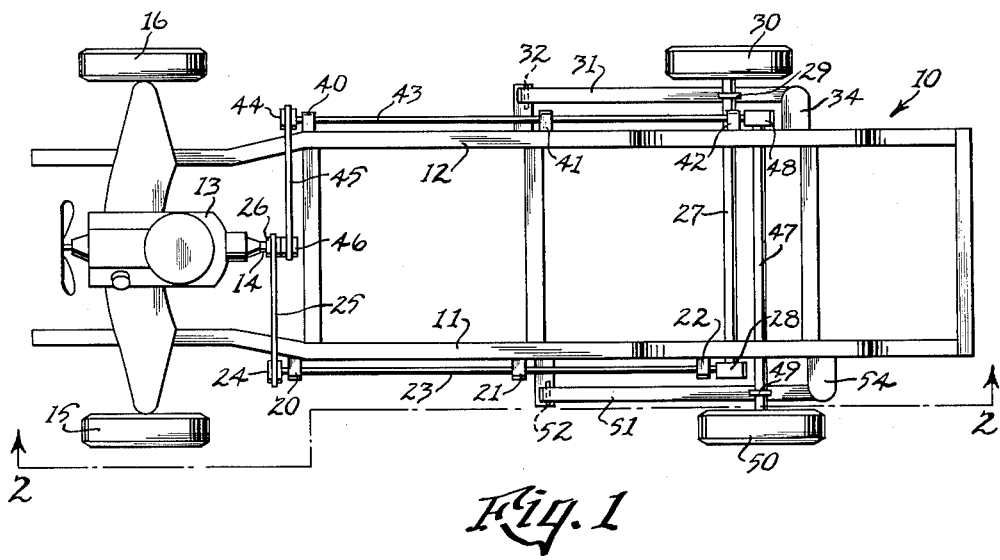
FIG. 1 is a top plan view of the invention incorporated in a motor vehicle frame.

Referring now more particularly to the drawings, a conventional motor vehicle frame 10 has substantially parallel side frame members or bars 11 and 12. Mounted on the front of the frame 10 is any conventional power source, such as an internal combustion engine 13 having a power take-off shaft 14, and a steerable front wheels 15 and 16.

Rotatably mounted along the outside of the left frame bar 11 in bearings 20, 21 and 22 is a drive shaft 23. Fixed to the front end of the drive shaft 23 is a pulley 24, around which passes a belt 25 driven by a pulley 26 mounted on the power take-off shaft 14. The drive shaft 23 is drivingly connected to a rear axle 27 through reduction gears, not shown, but housed within the reduction gear box 28 depending from the rear of the drive shaft 23 adjacent the bearing 22. The rear axle 27 extends transversely of the frame 10 from the reduction gear box 28 on the outside of the left frame bar 11 beyond the outside of the right frame bar 12, where the axle 27 is journalled in the bearing 29 and supports the right rear wheel 30. The right rear wheel bearing 29 is supported on an arm 31, which is pivoted at its forward end by a pin 32 to the right frame bar 12. The rear end of the arm 31 is suspended behind the right rear wheel bearing 29 by means of a coiled spring 33 depending from and fixed to a flange 34 extending laterally from the right frame bar 12.

In a like manner, bearings 40, 41 and 42 are fixed to the outside of the right frame bar 12 to rotatably support the drive shaft 43. A pulley 44 is mounted on the front of the right drive shaft to be driven by the belt 45, which in turn is driven by a pulley 46 fixed to the rear end of the power take-off shaft 14. The rear axle 47 is drivingly connected to the drive shaft 43 by means of reduction gearing housed within the reduction gear box 48, depending from the rear end of the drive shaft 43 adjacent the bearing 42. The rear axle 47 extends from the reduction gear box 48 outside the right frame bar 12 transversely of the frame 10 and beyond the outside of the left frame bar 11, where the axle 47 is journalled in the wheel bearing 49 and supports the left rear wheel 50. The left rear wheel bearing 49 is supported on an arm 51, pivoted at its forward end by means of a pin 52 to the left frame bar 11. The rear end of the arm 51 is suspended by a coil spring 53 to the rear of the wheel bearing 49, the upper end of the coil spring 53 being fixed to and depending from a flange 54 extending laterally from the left frame bar 11.

Figure 2:
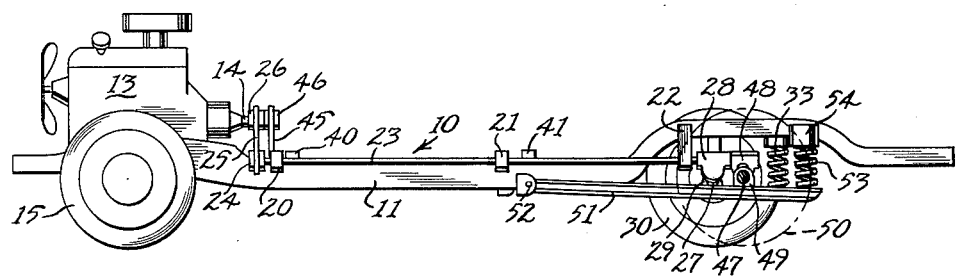
FIG. 2 is a section taken along the line 2—2 of FIG. 1.

The operation of the invention becomes readily apparent from the previous description. Although the engine 13, power take-off shaft 14, and pulleys 26 and 46 are merely illustrative to indicate independent drives for the drive shafts 23 and 43, it will be readily understood that a clutch and a differential may be included between the power shaft 14 and the drive shafts 23 and 43. The pulleys 26 and 46 rotate in the same direction to drive the belts 25, 45, pulleys 24 and 44, and drive shafts 23 and 43 in the same direction. The rotary motion of the drive shafts 23 and 43 is conoveyed through the gearing in reduction gear boxes 28 and 48 to rotate the rear axles 27 and 47, respectively, and the wheels 30 and 50 at a reduced forward speed. As best disclosed in FIGS. 1 and 2, the right rear wheel 30 and its axis 27 are staggered slightly forward of the left rear wheel 50 and its axle 47. Such a staggered wheel arrangement permits only one rear wheel at a time to receive the full impact of a transverse rise or depression in the road surface, each impact of which will be conveyed independently at different instances of time to the frame 10. In effect, the wheels 30 and 50 "step" over any irregularity in the road surface.

By virtue of this wheel assembly, the unsprung weight, that is, the weight of components of the vehicle not supported by the springs, is maintained at a minimum. Such unsprung weight includes the tires and wheels 30 and 50, the wheel bearings 29 and 49, the arms 31 and 51 and the axles 27 and 47, which are simply straight cylindrical shafts of minimum weight. This invention eliminates the usual unsprung weight components, such as the central drive shaft, differential, axle housings and other massive components found in the rear of conventional motor vehicles. On the other hand, the frame 10, both drive shafts 23 and 43, the reduction gear boxes 28 and 48, all the forward driving mechanisms including the differential, not shown, are sprung weight, that is, the weight of components supported by the springs 33 and 53. Because both drive shafts 23 and 43 are so located as to constitute sprung weight, they are subject to fewer forces and less strain and vibration than the single drive shaft now employed in conventional automobiles as unsprung weight. Thus, the design of the entire rear wheel assembly, including the drive shafts, can be made of lighter materials and of less complicated design.

With one end of each of the rear axles 27 and 47 journalled in their respective reduction gear boxes 28 and 48 and the opposite ends of these axles supporting their corresponding rear wheels 30 and 50, each axle 27 and 47 is adapted to pivot in a substantially vertical plane respectively about the drive shafts 23 and 43 as axes, when the corresponding wheel 30 or 50 encounters an irregularity in the road surface. With such a long radius, the deviation of each wheel 30 and 50 from its normal vertical plane is slight. Moreover, because of the particular structure and assembly of the axles 27 and 47, no radius rods are required.

It is also readily apparent that any shock encountered by either of the wheels 30 or 50 will be independently absorbed through the respective coil spring 33 or 53 by the frame 10.

Because of the independent drive shafts 23 and 43 located on opposite sides of the frame members 11 and 12, respectively, a chassis may be mounted on the frame 10 having a completely flat floor, and the problem of the "tunnel-hump" for a central drive shaft is eliminated.

Figure 3:
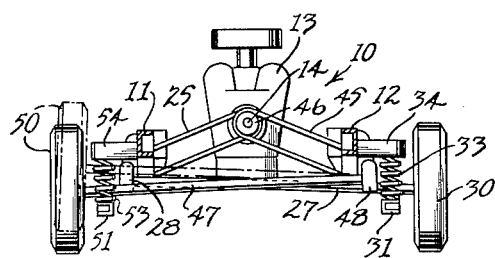
FIG. 3 is a rear elevation of the invention, disclosing alternate positions of the left rear wheel.

Although the rear axles 27 and 47 are disclosed as slightly crossed in FIG. 3, the axles may lie parallel in a horizontal plane and spaced from each other at any desired distance.

It is believed that a motor vehicle made according to this invention will not only require lighter weight and less expensive elements for a wheel and drive assembly, but will also absorb less shock and strain and will provide a smoother ride for occupants of the vehicle.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. In a vehicle, a frame, a first axle bearing and first spring means for suspending said first bearing below one side of said frame, a second axle bearing and second spring means for suspending said second bearing below the opposite side of said frame, a first axle rotatably supported by said first bearing and extending from one side to the other side of said frame, a first wheel mounted on said first axle adjacent said first bearing, a second axle rotatably supported by said second bearing and extending from one side to the other side of said frame, a second wheel mounted on said second axle adjacent said second bearing, a first drive shaft rotatably mounted along said opposite side of said frame, first reduction gear means drivingly connecting said first drive shaft to the end of said first axle opposite said first wheel to permit pivotal movement of said first wheel about the axis of said first drive shaft, a second drive shaft extending along said one side of said frame, a second reduction gear means drivingly connecting said second drive shaft to the end of said second axle opposite said second wheel to permit pivotal movement of said second wheel about the axis of said second shaft, and means for independently driving each drive shaft.

2. The invention according to claim 1 in which said first axle is spaced in front of said second axle to provide staggered first and second wheels.

References Cited in the file of this patent
UNITED STATES PATENTS

| | | |
|---|---|---|
| 844,615 | Palmer | Feb. 19, 1907 |
| 2,685,777 | Plas | Aug. 10, 1954 |

FOREIGN PATENTS

| | | |
|---|---|---|
| 108,732 | Great Britain | Aug. 22, 1917 |